United States Patent
Nakamoto

(10) Patent No.: US 7,554,282 B2
(45) Date of Patent: Jun. 30, 2009

(54) METHOD OF CONTROLLING MOVEMENT OF ROBOT, MOBILE ROBOT, AND COMPUTER PROGRAM PRODUCT

(75) Inventor: Hideichi Nakamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 11/723,408

(22) Filed: Mar. 19, 2007

(65) Prior Publication Data

US 2008/0079383 A1  Apr. 3, 2008

(30) Foreign Application Priority Data

Sep. 28, 2006  (JP) .............................. 2006-265097

(51) Int. Cl.
*G05D 1/00* (2006.01)

(52) U.S. Cl. .............................. 318/587; 701/1; 701/23; 701/25; 701/200; 701/201; 701/202

(58) Field of Classification Search ................. 318/587; 701/1, 23, 25, 200, 202, 207; 116/DIG. 43
See application file for complete search history.

(56) References Cited

U.S. PATENT DOCUMENTS

| | | | | |
|---|---|---|---|---|
| 4,821,192 A | * | 4/1989 | Taivalkoski et al. ............ | 701/25 |
| 4,846,297 A | * | 7/1989 | Field et al. .................... | 180/169 |
| 5,367,458 A | * | 11/1994 | Roberts et al. ................ | 701/25 |
| 5,400,244 A | * | 3/1995 | Watanabe et al. ............. | 701/28 |
| 6,128,571 A | * | 10/2000 | Ito et al. ....................... | 701/201 |
| 6,211,798 B1 | * | 4/2001 | Albrecht et al. ............. | 340/990 |
| 6,424,933 B1 | * | 7/2002 | Agrawala et al. .............. | 703/2 |
| 6,917,855 B2 | * | 7/2005 | Gonzalez-Banos et al. .. | 700/245 |
| 7,053,580 B2 | * | 5/2006 | Aldred ......................... | 318/580 |
| 7,211,980 B1 | * | 5/2007 | Bruemmer et al. .......... | 318/587 |
| 7,330,787 B2 | * | 2/2008 | Agrawala et al. ........... | 701/208 |
| 2005/0085947 A1 | * | 4/2005 | Aldred et al. ............... | 700/253 |
| 2006/0106496 A1 | * | 5/2006 | Okamoto ..................... | 700/253 |

FOREIGN PATENT DOCUMENTS

| JP | 2005-288628 | 10/2005 |
|---|---|---|
| JP | 2005-339408 | 12/2005 |

* cited by examiner

*Primary Examiner*—Rita Leykin
(74) *Attorney, Agent, or Firm*—Nixon & Vanderhye, PC

(57) ABSTRACT

A method of controlling movement of a robot, the method includes detecting a target person to be followed, following detected target person, detecting an environment of a current position around the robot while following the detected target person, determining whether detected environment satisfies a predetermined target-point condition, specifying the current position as a target point, when the detected environment satisfies the predetermined target-point condition, and creating a path along which the robot travels including specified target point, based on the specified target point and a movable path for the robot stored in a movable path storing unit.

19 Claims, 14 Drawing Sheets

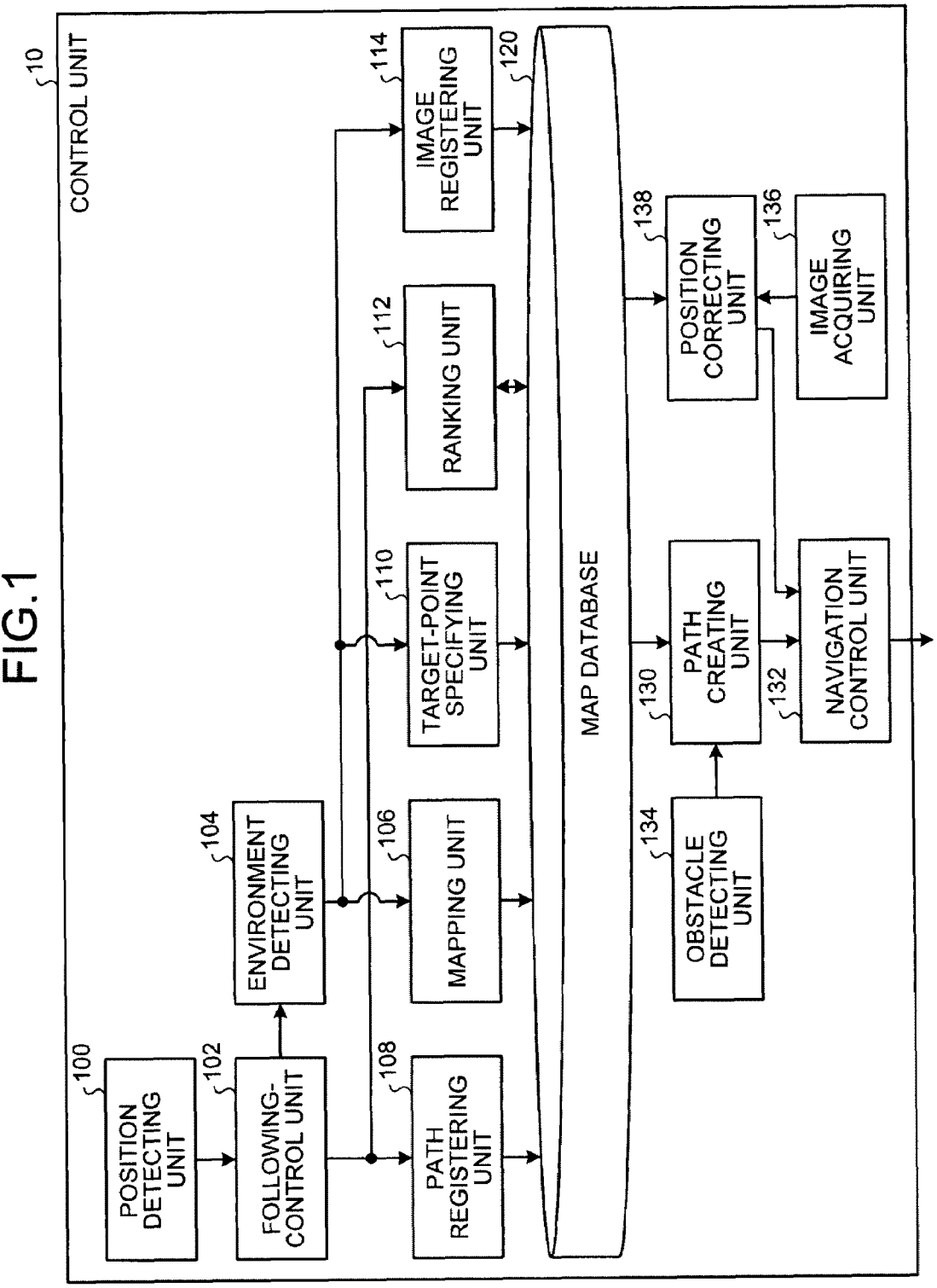

FIG.13

| SEGMENT PATH | RANKING VALUE |
|---|---|
| A | 4 |
| B | 1 |
| C | 3 |
| D | 1 |
| E | 3 |
| F | 3 |
| G | 2 |
| H | 2 |
| I | 4 |
| J | 4 |
| K | 2 |
| L | 2 |
| M | 2 |
| N | 2 |

FIG.14

| TARGET POINT | RANKING VALUE |
|---|---|
| α | 3 |
| β | 4 |
| γ | 2 |

METHOD OF CONTROLLING MOVEMENT OF ROBOT, MOBILE ROBOT, AND COMPUTER PROGRAM PRODUCT

CROSS-REFERENCE TO RELATED APPLICATIONS

This application is based upon and claims the benefit of priority from the prior Japanese Patent Application No. 2006-265097, filed on Sep. 28, 2006; the entire contents of which are incorporated herein by reference.

BACKGROUND OF THE INVENTION

1. Field of the Invention

The present invention relates to a method of controlling movement of robot, a mobile robot and a computer program product.

2. Description of the Related Art

Some movable navigation robots have been developed recently to guide persons in premises. The movable navigation robots generally have a map of an environment where the robots travel, and create a path along which the robots travel based on the map. JP-A 2005-288628 (KOKAI), for example, discloses a robot that creates a circuit path based on data and path data stored in advance, and travels along the circuit path.

However, in the technique disclosed in JP-A 2005-288628 (KOKAI), it takes a considerable time for a user to input the map data and the path data. To solve the problem, JP-A 2005-339408 (KOKAI) discloses an improved technique for enabling a robot to automatically create the map data. According to the improved technique, the person can save the time for inputting the map data to the robot.

However, even with the improved technique, a map including all required places can not be created, which makes it difficult for the robot to guide a person to an appropriate path.

SUMMARY OF THE INVENTION

According to one aspect of the present invention, a method of controlling movement of a robot, the method includes detecting a target person to be followed; following detected target person; detecting an environment of a current position around the robot while following the detected target person; determining whether detected environment satisfies a predetermined target-point condition; specifying the current position as a target point, when the detected environment satisfies the predetermined target-point condition; and creating a path along which the robot travels including the target point, based on the target point and a movable path for the robot stored in a movable path storing unit.

According to another aspect of the present invention, a mobile robot includes a detecting unit that detects a target person to be followed; a following-control unit that controls to follow the target person detected by the detecting unit; an environment detecting unit that detects an environment of a current position around the robot while following the target person; a target-point specifying unit that specifies a current position as a target point, when it is determined that detected environment satisfies a predetermined target-point condition; a movable path storing unit that registers a movable path for the robot; and a path creating unit that creates a path along which the robot travels including target point, based on the movable path for the robot registered in the movable path storing unit and target point specified by the target-point specifying unit.

A computer program product according to still another aspect of the present invention causes a computer to perform the method according to the present invention.

BRIEF DESCRIPTION OF THE DRAWINGS

FIG. 1 is a functional block diagram of a control unit of a robot according to an embodiment of the present invention;

FIG. 13 is a table of ranked segment paths stored in a map database after the robot traveled paths shown in FIG. 12;

FIG. 14 is a table of ranked target points stored in the map database after the robot traveled paths shown in FIG. 12;

DETAILED DESCRIPTION OF THE INVENTION

Figure 2A:
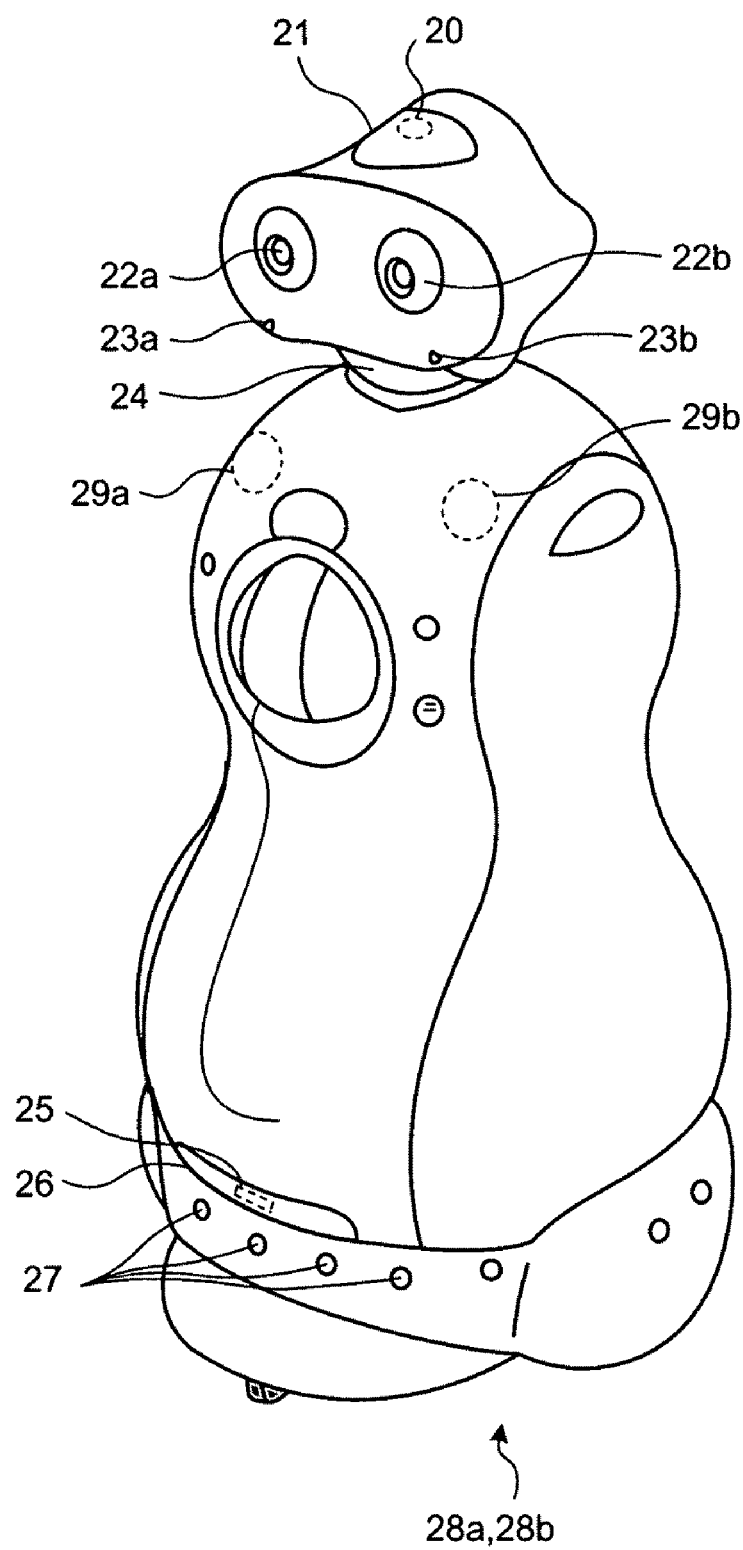
FIG. 2A is a perspective view showing an appearance of the robot.

Exemplary embodiments of the present invention are described in detail below with reference to the accompanying drawings. The present invention is not limited to these exemplary embodiments.

As shown in FIG. 1, a control unit 10 creates a guidance pathway or a moving pathway along which a robot 1 travels for guiding a visitor in premises such as a museum. Namely, the control unit 10 controls to prepare a guidance pathway.

The control unit 10 includes a position detecting unit 100, a following-control unit 102, an environment detecting unit 104, a mapping unit 106, a path registering unit 108, a target-point specifying unit 110, a ranking unit 112, an image registering unit 114, a map database (DB) 120, a path creating unit 130, a navigation control unit 132, an obstacle detecting unit 134, an image acquiring unit 136, and a position correcting unit 138.

The position detecting unit 100 specifies a person around the robot 1 as a target person to be followed based on a result of detection using a sensor or the like mounted on the robot 1. When two or more persons are detected, the position detecting unit 100 specifies any one of the persons as the target person, and calculates a position of the target person.

Figure 2B:
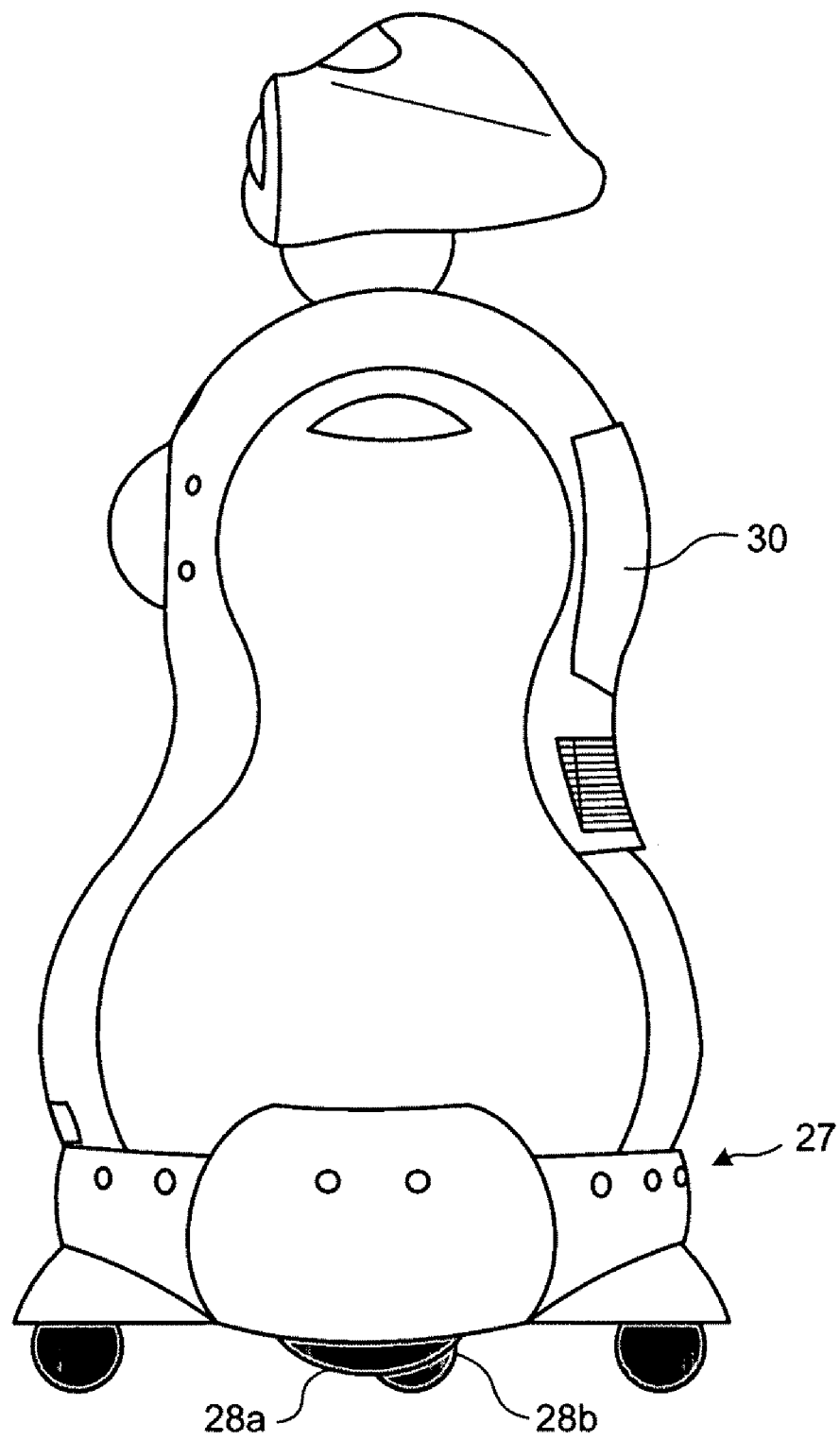
FIG. 2B is a side view showing an appearance of the robot.

Sensors mounted on the robot 1 are described below. FIG. 2A is a perspective view of the robot 1, and FIG. 2B is a side view of the robot 1. The robot 1 includes a head rangefinder 20, a head cover 21, cameras 22a and 22b, microphones 23a and 23b, a neck mechanism 24, an abdomen rangefinder 25, an abdomen cover 26, ultrasonic sensors 27, driving wheels 28a and 28b, speakers 29a and 29b, and a touch panel 30.

The head rangefinder 20 takes a scan using a laser beam to measure a distance to and a shape of an obstacle on a plain environment around the robot 1. The head rangefinder 20 is installed on a head of the robot 1 that is connected to the neck mechanism 24 having two-degree-of-freedom (i.e., the horizontal rotation and the vertical rotation). It means that the head rangefinder 20 can detect an obstacle from a large range by scanning at various angles. The head rangefinder 20 can also measure a three-dimensional shape. The head rangefinder 20 is covered by the head cover 21 manufactured by transmissive material through which the laser transmits. By covering the head rangefinder 20, the head cover 21 protects the head rangefinder 20 from failures that would be caused by no protector for the head rangefinder 20.

The cameras 22a and 22b acquire an image and range data. The cameras 22a and 22b are installed on the head that is connected to the neck mechanism 24, so that various images can be acquired from a large range by changing an angle of the cameras 22a and 22b.

The microphones 23a and 23b acquire a speech, for more particularly, collects a human speech for instructing. Due to the double microphones (i.e., the microphones 23a and 23b), the microphone array can be employed even in a noisy environment. The abdomen rangefinder 25 is installed on an abdomen of the robot 1 and detects an obstacle at the foot of the robot 1. The abdomen rangefinder 25 is covered by the abdomen cover 26.

The ultrasonic sensors 27 detect a transparent obstacle such as glass that cannot be detected by either the head rangefinder 20 or the abdomen rangefinder 25. The ultrasonic sensors 27 are attached to a lower part of the robot 1, entirely surrounding the robot 1.

The driving wheels 28a and 28b are positioned at both sides of the robot 1, respectively, and drive independently. By controlling two motors for driving the driving wheels 28a and 28b, the robot 1 can move straight, turn, and circle. In addition, the robot 1 includes an odometer (not shown) for calculating a position and an orientation of the robot 1 by, detecting a rotation angle of the driving wheels 28a and 28b.

The speakers 29a and 29b output a speech for explanation during guidance. The robot 1 can take an action using the speech to communicate with a person. The touch panel 30 is used for receiving an operation from a user and displaying information to the user. The touch panel 30 is accommodated inside the robot 1 normally for a security and a failure prevention, and is made accessible when the user performs an operation.

The following-control unit 102 shown in FIG. 1 controls speeds of the driving wheels 28a and 28b depending on walking conditions of the target person. By controlling the speeds of the driving wheels 28a and 28b, the robot 1 can follow the target person detected by the position detecting unit 100 keeping at a constant distance with the target person. The following-control unit 102 also controls an orientation of the robot 1 by, for example, changing angles of the cameras 22a and 22b.

The environment detecting unit 104 detects the environment while the robot 1 travels under the control of the following-control unit 102. More particularly, the environment detecting unit 104 detects an obstacle including a person that is positioned around the robot 1 and prevents the robot 1 from traveling, and calculates a position and a shape of the obstacle.

The mapping unit 106 creates a map based on the environment information obtained by the environment detecting unit 104 while the robot 1 travels under the control of the following-control unit 102. A position of a passable area or an impassable area detected by the environment detecting unit 104 is recorded on the map. The mapping unit 106 further registers the map in the map database 120.

The path registering unit 108 registers a path along which the robot 1 has traveled under the control of the following-control unit 102 as a path passable for the robot 1 in the map database 120.

When a position satisfying a target-point condition is detected while the robot 1 travels under the control of the following-control unit 102, the target-point specifying unit 110 specifies the detected position as a target point and registers a specified target point in the map database 120. More particularly, the target-point specifying unit 110 registers the specified target point in a form relating target point information for identifying the target point with positional information of the target point. The target-point condition is defined in advance. The target-point condition can be, for example, that a plurality of persons is detected. Based on an expectation that visitors usually stop in front of an exhibit, a place where a plurality of persons is detected is assumed to be in front of an exhibit, so that the position detecting unit 100 registers the position as the target point. The target-point specifying unit 110 works as both a target-point specifying unit and a target-point registering unit.

The ranking unit 112 divides the path registered by the mapping unit 106 into a plurality of segments and ranks the segments. The ranking unit 112 also ranks the target points registered by the target-point specifying unit 110 in the map database 120. The rank of the sections is defined based on the number of times for each section at which the robot 1 passes through. Similarly, the rank of the target points is defined based on the number of times for each target point at which the robot 1 passes through.

After the target point is detected, the image registering unit 114 registers a landmark image shot by a camera and a shooting position from which the landmark image is shot in the map database 120. The shooting position can be on the target point or at any position near the target point. The landmark image is used for correcting a position when the robot 1 travels along a navigation path created based on the paths registered in the map database 120.

The robot 1 travels along the navigation path using the odometry. A position of the robot 1 estimated using the odometry, however, can be different from the real position due to slippery or the like. The robot 1 corrects the estimated position using the landmark image. More particularly, the robot 1 shoots an image from a shooting position corresponding to the landmark image or from a position near the shooting position, compares the image with the landmark image, determines whether the estimated position corresponds to the real position based on a result of the comparison, and corrects the estimated position if necessary.

The map database 120 stores therein the map drawn by the mapping unit 106, the path registered by the path registering unit 108, the target point specified by the target-point specifying unit 110, and the landmark image registered by the image registering unit 114. In addition, the map database 120 stores action data containing an object displayed at the target point and an action of the robot 1 in front of the object.

The path creating unit 130 creates a navigation path including the registered target points based on the paths and the target points registered in the map database 120. The path creating unit 130 creates the navigation path including an appropriate segment based on the rank of the segments. Furthermore, the path creating unit 130 determines an order of the target points passed through by the robot 1.

The navigation control unit 132 operates the driving wheels 28a and 28b to make the robot 1 travel along the navigation path created by the path creating unit 130. When the robot 1 describes the object at the target point, the navigation control unit 132 operates the speaker 29a and 29b based on the action data at the target point.

The obstacle detecting unit 134 detects an obstacle while the robot 1 travels under the control of the navigation control unit 132. The obstacle detected by the obstacle detecting unit 134 is an obstacle that is newly in the passable area of the map drawn by the mapping unit 106. For example, if a new wall has been installed on the navigation path due to route rearrangement, the obstacle detecting unit 134 detects the new wall as the obstacle. The obstacle detecting unit 134 determines only an obstacle detected in the passable area as the obstacle. When the obstacle detecting unit 134 detects the obstacle, the path creating unit 130 creates a new navigation path starting from a position where the obstacle is detected.

When the robot 1 reaches a position of a landmark registered in the map database 120, the image acquiring unit 136 instructs the cameras 22a and 22b to shoot an image and acquires the image. The position correcting unit 138 compares an acquired image with the landmark image registered in the map database 120, and, when the image doesn't correspond to the landmark image, corrects the position of the robot 1 based on a result of the comparison.

Figure 3:
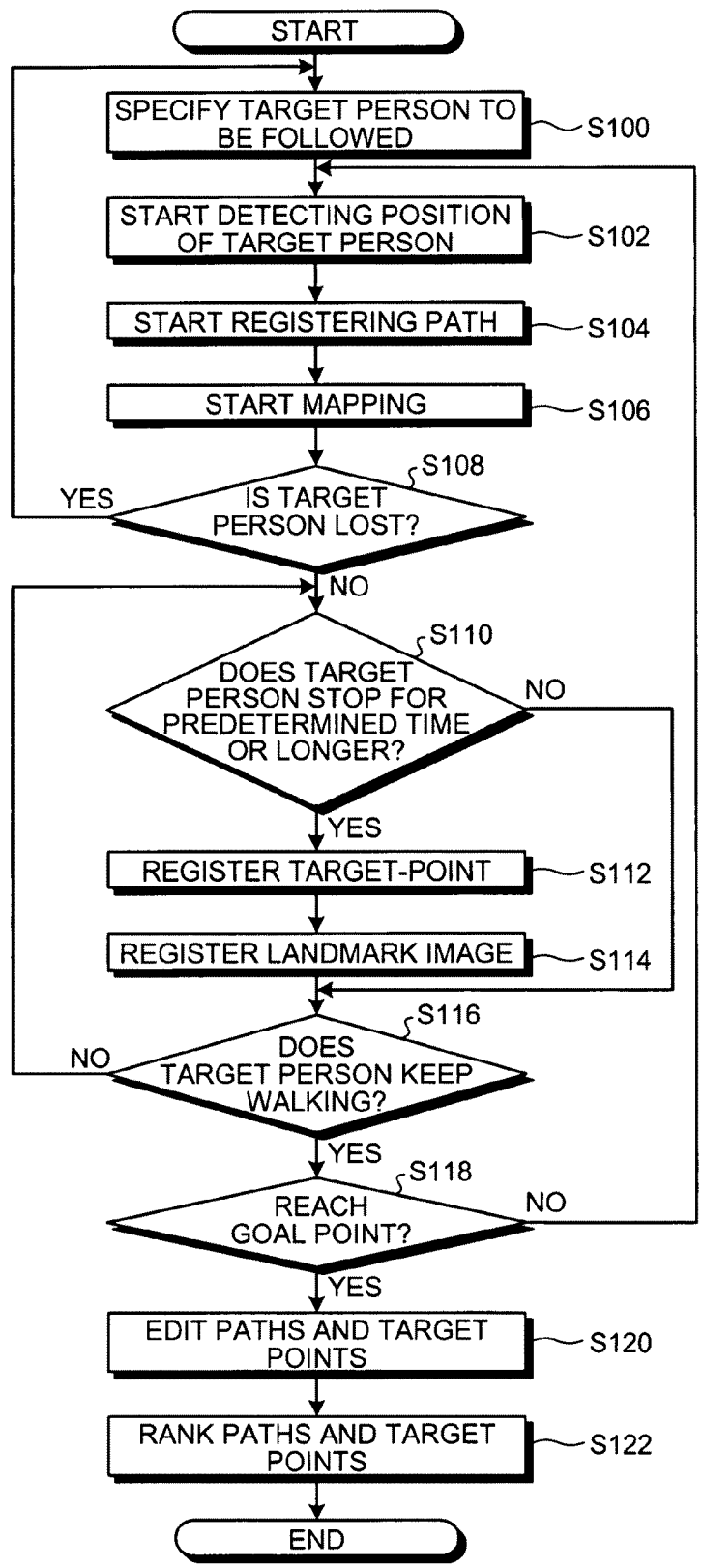
FIG. 3 is a flowchart of a target-point registering process that is a part of a movement control process performed by the control unit.

FIG. 3 is a flowchart of a target-point storing process that is a part of a movement control process performed by the control unit 10. In the target-point registering process, the position detecting unit 100 observes the environment around the robot 1 and specifies the target person to be followed (step S100). The position detecting unit 100 starts detecting a position of the target person (step S102).

Figure 4A:
FIGS. 4A and 4B are images used for explaining a process for specifying a target person to be followed and for detecting a position of the target person.
Figure 4B:

FIG. 4A is an image shot by the cameras 22a and 22b. FIG. 4B is a stereo range image shot by the cameras 22a and 22b. The closer a portion of the range image is, the brighter the portion is painted; and the farther a portion is, the darker the portion is painted.

By discriminating an area of a person in the image from an area of a background in the image using the range image and trimming the area of the background off, the person can be detected. A relative position of the person can be calculated from the range data or a position in the image.

An object is discriminated from another using a discontinuity in the range data. Using this method, the number of persons in the image can be detected. Even when two or more persons are overlapped, each person is discriminated from the overlapped person additionally using the skin-tone detection or the face detection. Therefore, the detected number of persons is accurate.

At the step of specifying the target person, when two or more persons are detected, any one of the persons is specified as the target person. When the robot 1 follows the target person, the target person is discriminated from other persons using a color or a pattern of clothes that the target person wears. A laser rangefinder or an infrared sensor with a capability of obtaining range data can be used for detecting the target person instead of the stereo camera.

Returning to FIG. 3, when the position of the target person is detected, the robot 1 is ready to follow the target person. When the following operation starts, the robot 1 also starts registering the movable path (step S104) and the map (step S106).

Figure 5:
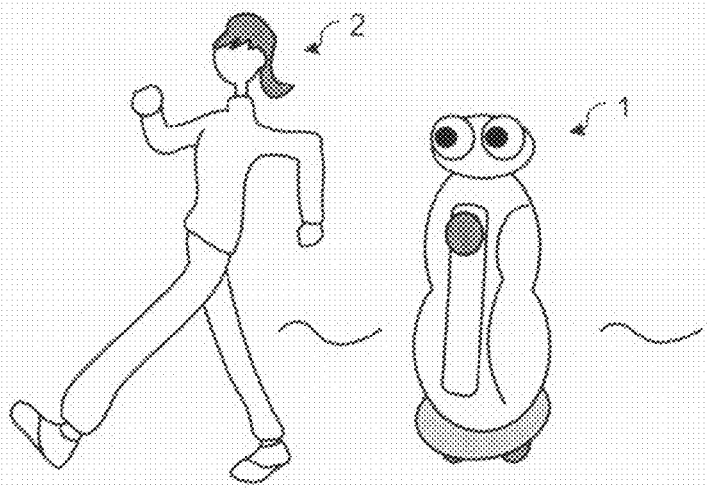
FIG. 5 is a schematic view in which the robot follows the target person.

As shown in FIG. 5, the position detecting unit 100 regularly detects the position of the target person while the robot 1 travels. The following-control unit 102 controls a traveling speed of the robot 1 depending on a walking speed of the target person, so that the robot 1 can follow the target person keeping at a constant distance.

The following-control unit 102 also controls a traveling direction of the robot 1 depending on a traveling direction of the target person. More particularly, the following-control unit 102 issues an instruction for turning the robot 1 based on the movement characteristics of the robot 1. The instruction for turning the robot 1 is sent to the driving wheels 28a and 28b and the traveling direction is changed via a motion of the driving wheels 28a and 28b. As described above, the robot 1 follows a target person 2 keeping at a constant distance.

Figure 6:
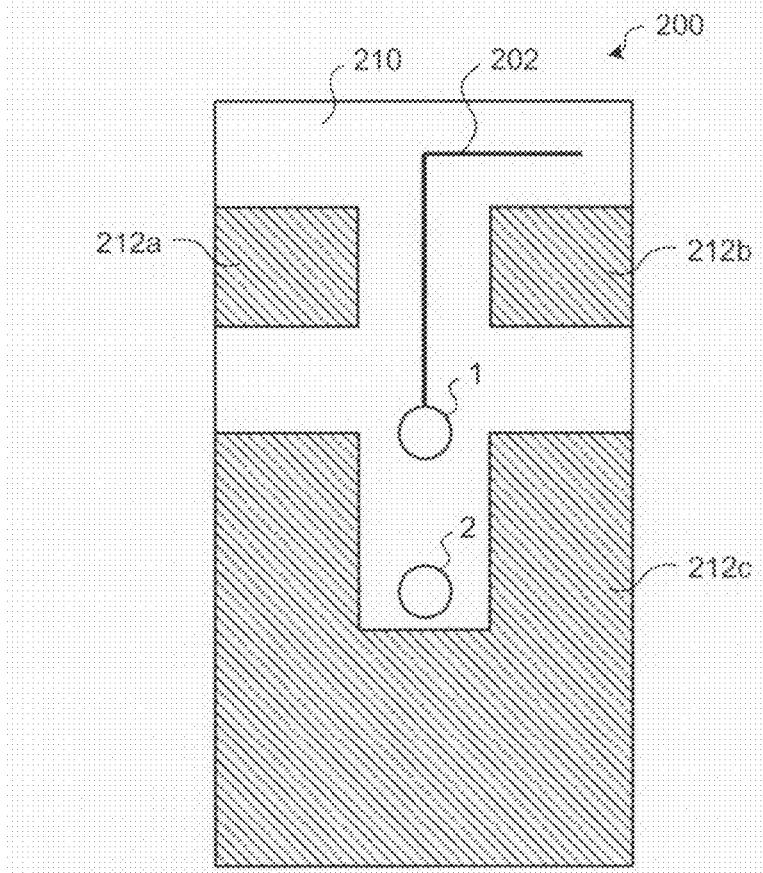
FIG. 6 is a schematic view for explaining a path registering process and a map registering process.

FIG. 6 is a plan view showing a part of a floor map of premises 200. The robot 1 travels along a trace 202 in the premises 200 following the target person 2. While the robot 1 follows the target person 2, the path registering unit 108 calculates coordinates of the trace 202 using the dead reckoning. The path registering unit 108 registers data on the coordinates of the trace 202 in the map database 120 as the path. It means that the path is automatically acquired by the robot 1 for itself.

While the robot 1 travels along the trace 202, the environment detecting unit 104 detects an obstacle based on a result of detection using the head rangefinder 20, the abdomen rangefinder 25, and the ultrasonic sensors 27. The obstacle detected by the environment detecting unit 104 is an obstacle that is positioned around the robot 1 and prevents the robot 1 from traveling. For example, wall areas 212a to 212c in FIG. 6 are detected as the obstacle.

The mapping unit 106 calculates a position and a shape of a detected obstacle and registers a result of the calculation as map data in the map database 120. In the map, a corridor area 210 is drawn as a passable area, and the wall areas 212a to 212c are drawn as an obstacle area. Because the robot 1 draws a map around the path while following the target person, mapping by a person such as an administrator can be saved. As described above, the robot 1 automatically draws the map including the necessary part and the path even when the passable area is large.

As shown in FIG. 3, when the target person is not detected, in other words the target person is lost (Yes at step S108), the control unit 10 returns to step S100 and specifies the target person again.

While the robot 1 follows the target person without losing the target person (No at step S108), when the target person stops at a position for a predetermined threshold time or longer (Yes at step S110), the target-point specifying unit 110 determined that the position satisfies the target-point condition and registers the position as the target point (step S112). The image registering unit 114 registers an image shot from the above target point or nearby as a landmark image in the map database 120 (step S114).

The present invention is not limited to the above target-point condition according to the embodiment. Any condition that can specify a suitable target position to which the robot 1 brings a visitor in the navigation can be employed as the target-point condition.

For example, the target-point condition can be that persons other than the target person are detected as many as a predetermined number or more. This condition is based on an expectation that there are many visitors in front of an exhibit.

For another example, the target-point condition can be that an exhibit is detected. More particularly, the target-point condition is that an image of a still object with a feature which discriminates the object from other areas is detected. Because most of exhibits are still dissimilar to visitors, the exhibits are discriminated from visitors. In addition, most of the exhibits have a feature that discriminates the exhibits from wall areas such as having a lot of edges.

For further another example, the target-point condition can be that a speech equal to or larger than a predetermined volume is detected. This condition is based on an expectation that a volume of speeches detected in front of an exhibit is loud because many visitors gather and talk. Based on the expectation, it is possible to specify the target point using the speeches.

As described above, by registering the target-point condition in advance, the position satisfying the target-point condition is detected and registered as the target point.

Figure 7:
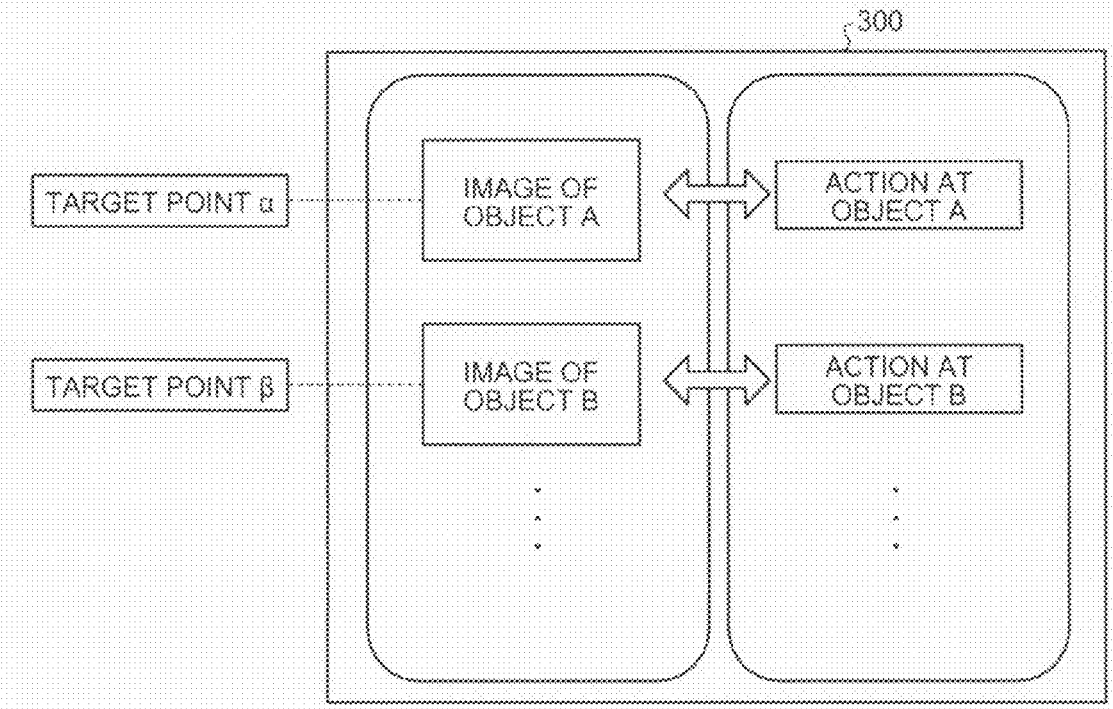
FIG. 7 is a block diagram for explaining a relation between a target point and action data.

Upon being registered, the target point is related to action data 300 that has already been registered in the map database 120. As shown in FIG. 7, the action data 300 contains an image of an object and an action that the robot 1 takes at the object. The action is, for example, outputting a description for the object using a speech.

The target-point specifying unit 110 relates the obtained target point to the action data. For example, if an image of an object A is obtained at a target point α, upon being registered, the target point α is related to the image of the object A. A relation between the target point and the object can be defined according to a user instruction.

As a result, the administrator can save inputting the action at the target point. Furthermore, when the object is replaced, the action data is updated concerning only a new action corresponding to a new object, which facilitates work for updating.

The action data is registered in a database registered other than the robot 1. The robot 1 acquires the action data from the database via a network or the like.

Figure 8:
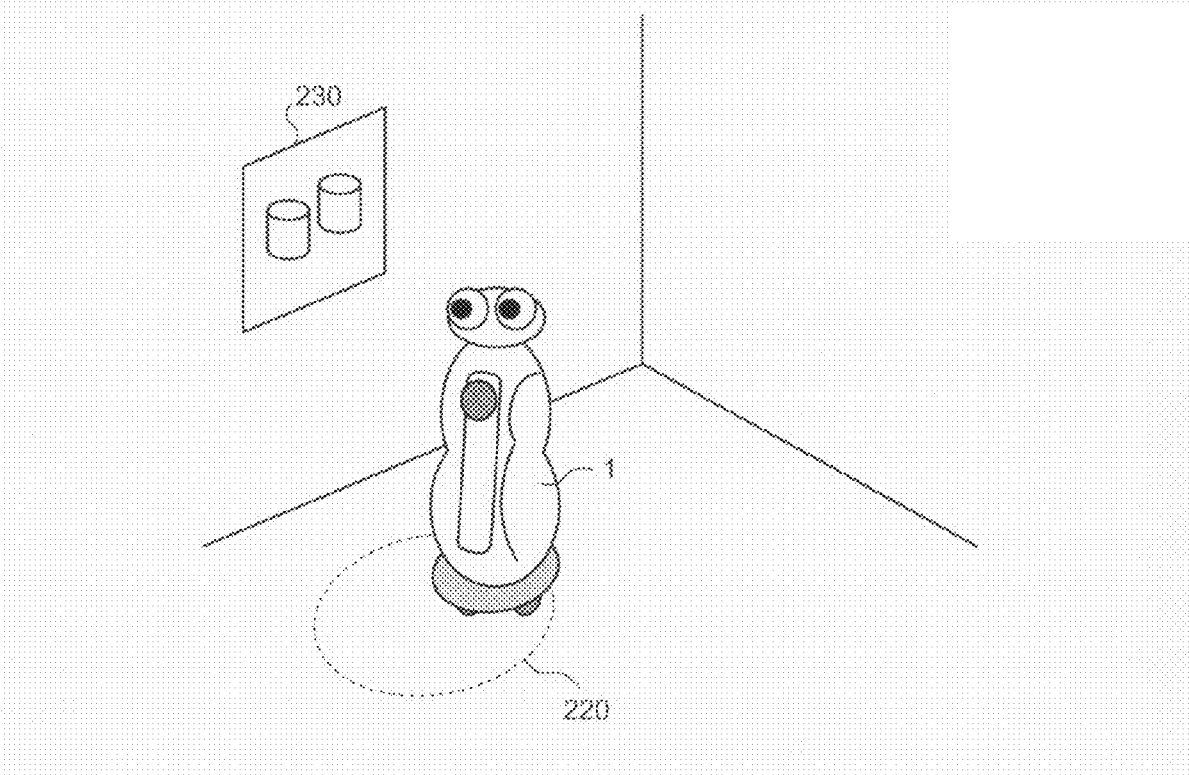
FIG. 8 is a view for explaining a process for registering a landmark image.

As shown in FIG. 8, at the step of registering the landmark image, the image registering unit 114 registers the landmark image that is detected around the robot 1 in the map database 120. In this case, an area with feature points, such as edges, closely getting together is selected as the landmark image. This is because, if the landmark image has such feature points, an image corresponding to the landmark image can be easily obtained using image processing.

It is assumed when the robot 1 is used for a picture tour in a museum as shown in FIG. 8, a preferable landmark is a picture displayed on a wall. It is easy to discriminate the picture from walls, because the picture has many feature points dissimilar to the wall having few feature points.

The robot 1 shoots an image of a picture 230 as a landmark image with the cameras 22a and 22b from a target point 220 or nearby. The landmark image is registered with related to a position of the robot 1 from which the landmark image is shot (hereinafter, "shooting position") and a position of a landmark (i.e., the picture 230). Data on the position of the landmark is represented using the z-coordinate indicating height in addition to the x-coordinate and the y-coordinate indicating a plane (the x-y plane) on which the path is represented, so that the height of the picture can be specified. The position of the landmark can be represented by an absolute value or by a relative value with the shooting position as a zero point.

Returning to FIG. 3, when the target person keeps walking, the control unit 10 repeats the process of registering the path, the map, and the landmark image until the robot 1 reaches a goal point (step S118). When the target person keeps stopping (No at step S116), the control unit 10 returns to step S110 to determine whether a stop time is equal to or longer than the threshold value.

Figure 9:
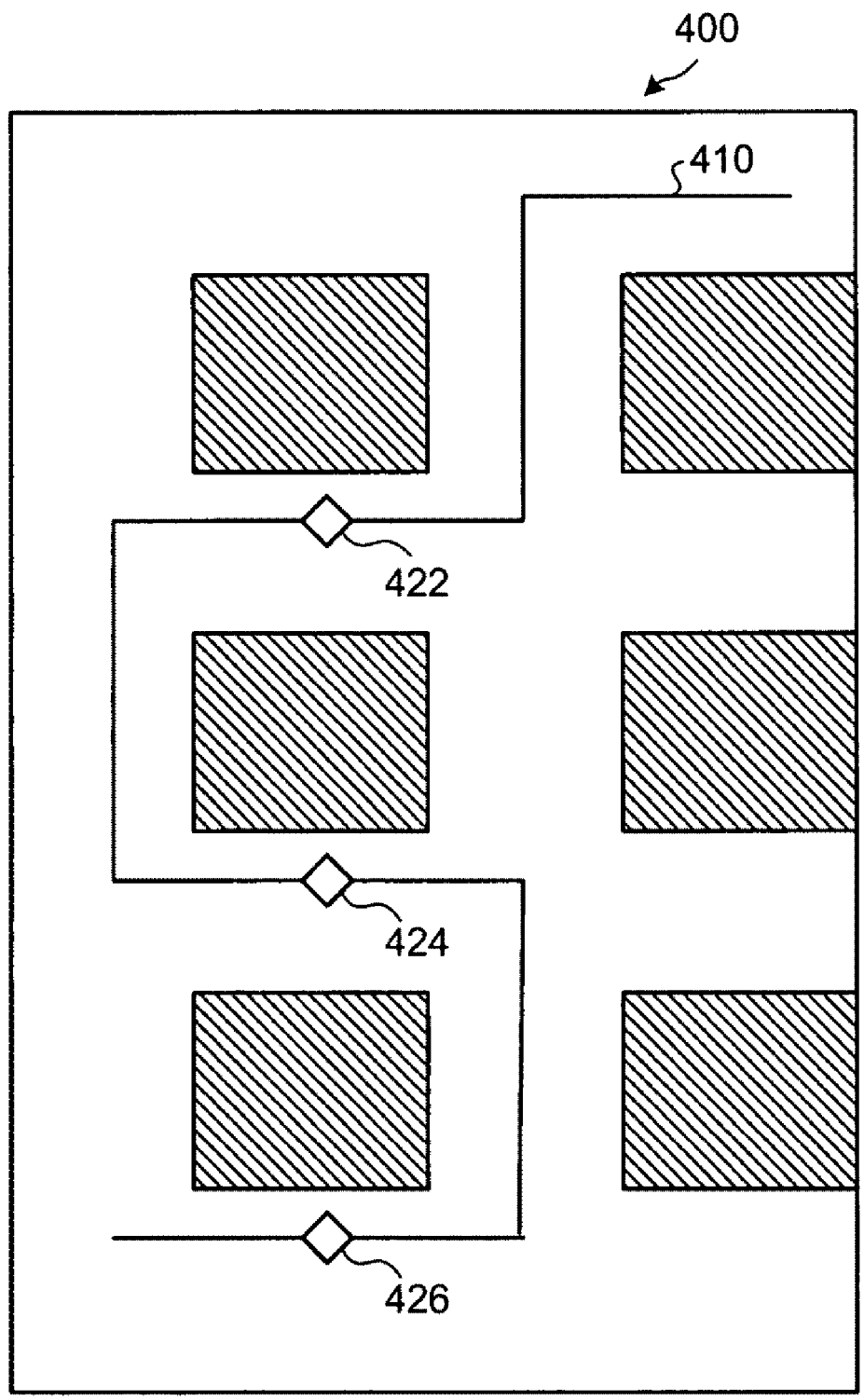
FIG. 9 is a schematic view of a map, a path, and a target point.

As a result of the above process, a map 400 including obstacles and passable areas as shown in FIG. 9 is registered. The path the robot 1 has actually traveled is registered as a path 410. Target points 422, 424, and 426 are also registered. The robot 1 automatically registers the map, the path and the target point, while following the target person.

As shown in FIG. 3, when the robot 1 reaches the goal point (Yes at step S118), the paths and the target points are edited (step S120). The goal point has been registered in the robot 1 in advance.

The control unit 10 basically continues the process for registering the path until the robot 1 has entirely registered the path along which the robot 1 travels in the navigation including all target points to be visited. Therefore, the control unit 10 can end the process for registering the path when, for example, the administrator determines that the entire path has been registered, instead of when the robot 1 reaches the goal point.

A process for editing the path and the target points is described with reference to FIG. 10. A path 412 has already been registered in the map database 120. A path 414 is a new path that is obtained as a result of a following. The paths 412 and 414 are different a little, so that the paths 412 and 414 are registered independently as different data. However, the paths 412 and 414 are substantially similar as for the path along which the robot 1 travels. In this case, to reduce a volume of the data, either one of the paths 412 and 414 is registered in the map database 120.

For example, the new path is registered in the map database 120 and the old path is deleted from the map database 120. It is allowable to calculate an average value of the two paths and registered the average value. It is also allowable to determine an appropriate path based on the two paths and overwrite the appropriate path on the path that has been registered already.

When a distance between the paths 412 and 414 is smaller than a predetermined threshold value, the two paths are determined to be similar and the two paths are merged in the manner described above. When the distance between the two paths is equal to or larger than the threshold value, the two paths are determined to be dissimilar and registered independently in the map database 120.

The target points are processed in a manner similar to the paths. When a distance between a target point that has been registered and a new target point is smaller than a threshold value, the two target points are determined to be similar, and either one of the two target points or an average value of the two target points is registered. It is allowable to determine an appropriate target point based on the two target points and overwrite the appropriate target point on the target point that has been registered already. When the distance between the two target points is equal to or larger than the threshold value, the two target points are determined to be dissimilar and registered independently in the map database 120.

Figure 10:
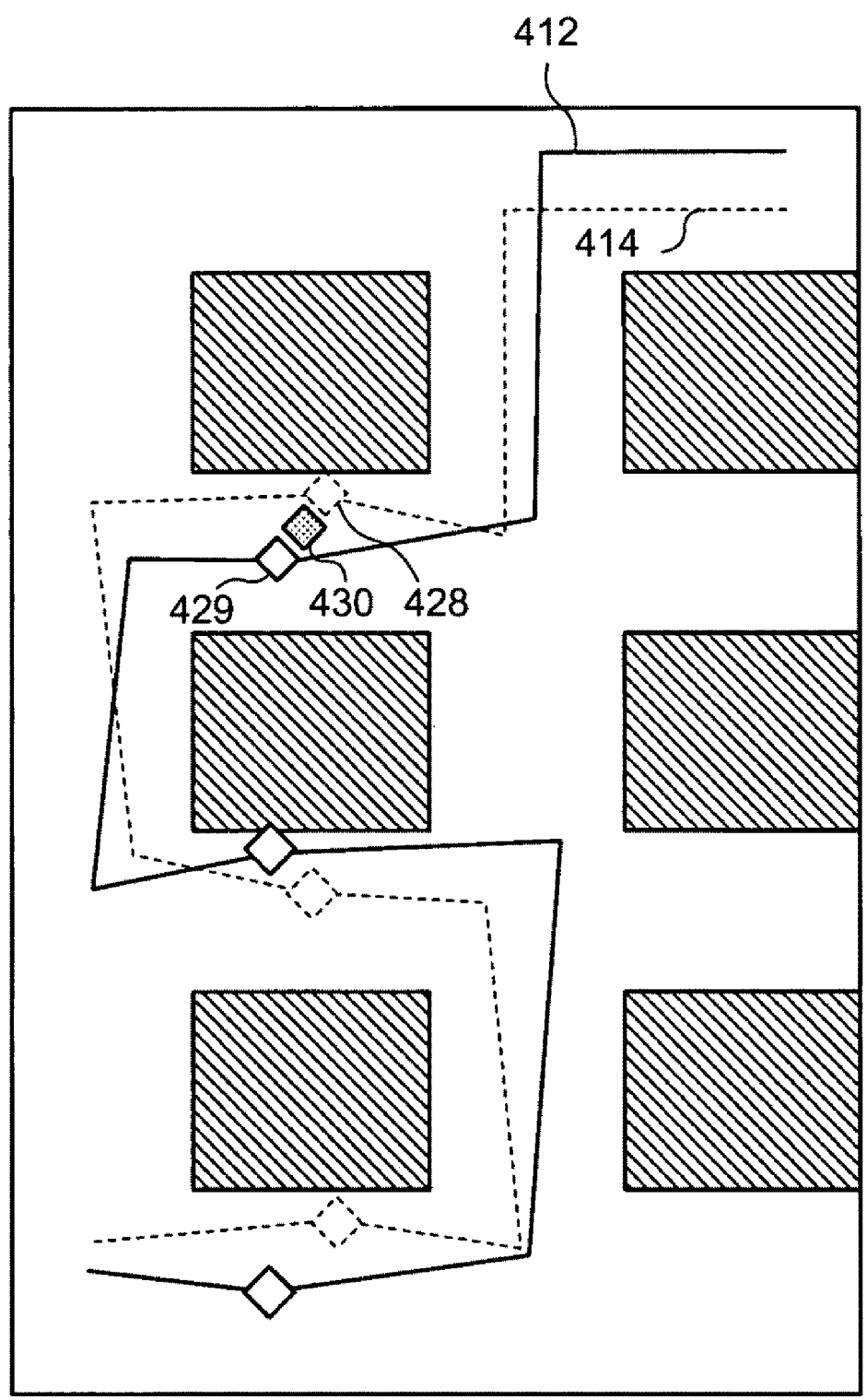
FIG. 10 is a schematic view for explaining a process for editing the path and the target point.

In the example as shown in FIG. 10, target points 428 and 429 are determined to be similar and a target point 430 that is an average of the target, points 428 and 429 is registered instead of the target points 428 and 429, which makes it possible to reduce a memory capacity of the map database 120.

Although according to the embodiment, the path and the target points are edited when the robot 1 reaches the goal point, it is allowable to edit the path or the target point at each time the path or the target point is registered.

Figure 11:
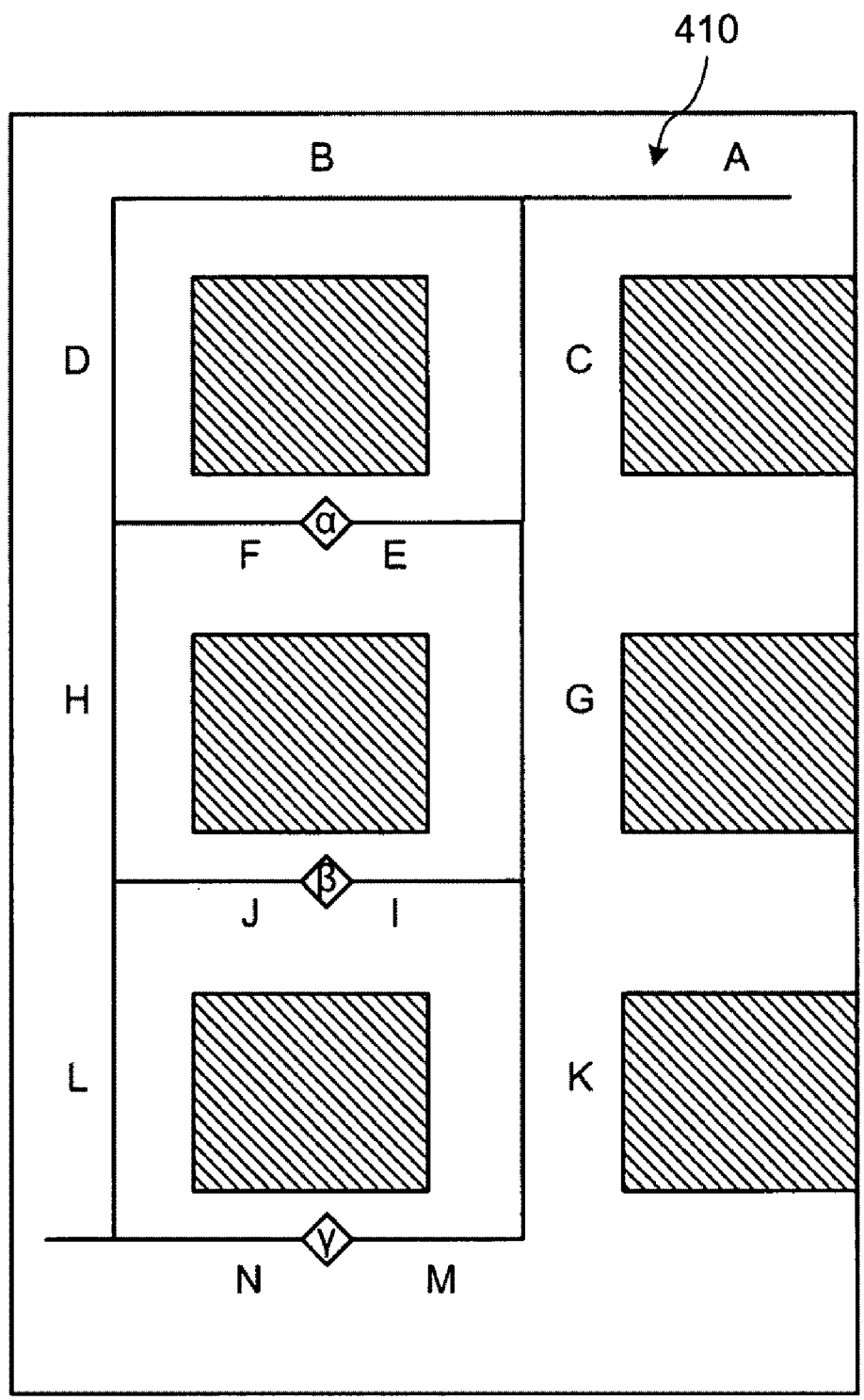
FIG. 11 is a schematic view of a segment path.

Returning to FIG. 3, after the process for editing the path and the target points, the ranking unit 112 ranks the paths and target points (step S122). As shown in FIG. 11, the ranking unit 112 cuts the path 410 into segment paths A to N. The path is cut at a turnoff point or a target point. When the robot 1 passes through a segment path, the ranking unit 112 adds one to a ranking value of the passed-through segment path.

Figure 12:
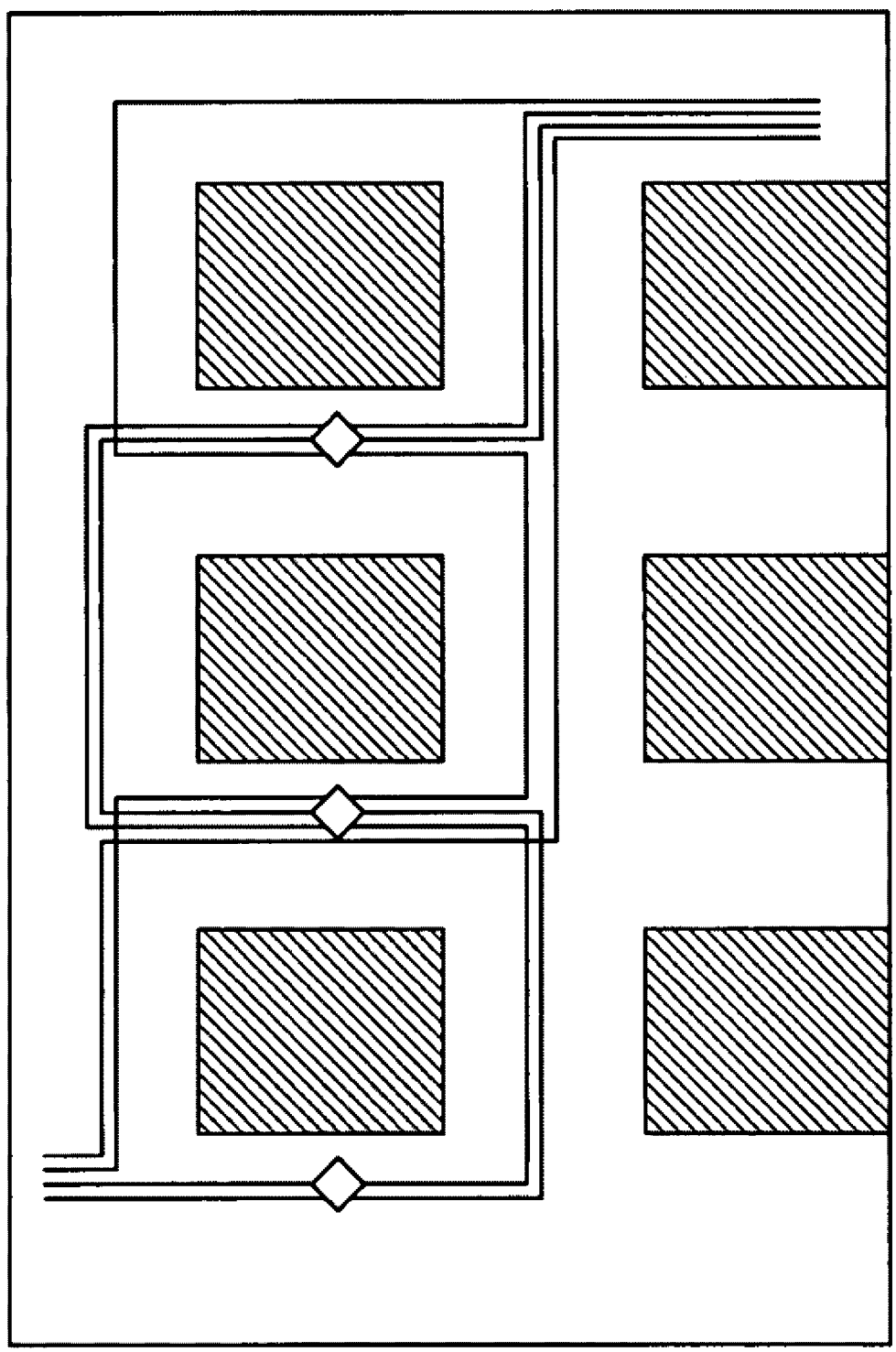
FIG. 12 is a trace along which the robot passes.

As shown in FIGS. 12 and 13, each of the segment paths is registered with related to a ranking value. As shown in FIG. 12, when the robot 1 passes through the segment path A for the first time, the ranking unit 112 registers the segment path A on a segment-path ranking table and sets a ranking value of the segment path A as one. When the robot 1 passes through the segment path A for the second time, the ranking unit 112 adds one to the ranking value of the segment path A, which has been registered.

After the robot 1 has traveled along four paths shown in FIG. 13, the ranking value of the segment path A becomes four, because the robot 1 has passed the segment A at four times. The ranking value of the segment path B becomes one, because the robot 1 has passed the segment B at one time. In other words, the number of times the robot 1 passes through for each segment path is registered as the ranking value in the segment-path ranking table.

As shown in FIG. 14, the number of times the robot 1 passes through for each target point is registered as a ranking value of the target point on a target-point ranking table in a manner similar to the segment paths. As described above, the ranking value is allocated to each of the segment paths or the target points. A navigation path is created using the ranking value.

By employing the above statistical approach, it is possible to create a more general path away from private preferences of path selection. Even when the environment is partially changed, it is possible to create a navigation path appropriate for a new environment using the ranking value updated after the robot 1 follows along several paths under the new environment.

Although, according to the present embodiment, the number of times the robot 1 passes through is used for ranking the segment paths, it is allowable to add another factor such as a width of a corridor to the ranking.

Furthermore, although according to the present example, the segment paths and the target points are ranked after the robot 1 reaches the goal point, it is allowable to update the ranking at each time the robot 1 passes through one of the segment paths or the target points.

More particularly, when the robot 1 reaches a turnoff point or a target point, a segment from a turnoff point or a target point immediately before the current turnoff point or the current target point to the current turnoff point or the current target point is registered as a new segment path in the segment-path ranking table. A ranking value of the new segment path is set to one. When the robot 1 passes through a segment path that has already registered, a ranking value of the segment path is added to one.

The target point is processed in the manner similar to the segment path. When the robot 1 passes through a new target point, a ranking value of the new target point is set to one. When the robot 1 passes through a target point that has already registered, a ranking value of the target point is added to one.

Figure 15:
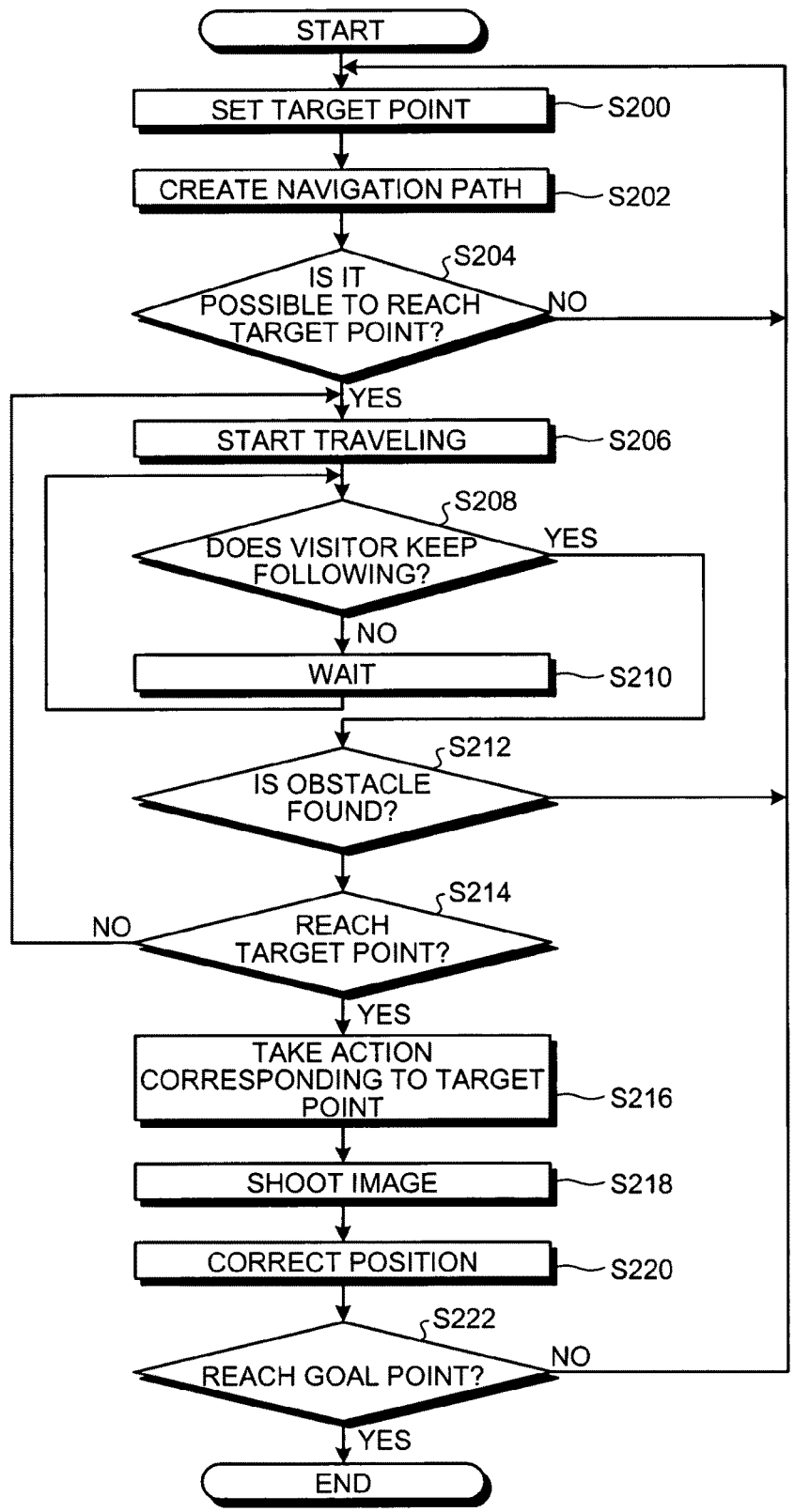
FIG. 15 is a flowchart for explaining a navigation process that is a part of the movement control process performed by the control unit.

When main paths of the premises where the robot 1 travels are registered in the target-point registering process, the robot 1 is ready to be switched to a navigation mode for guiding a visitor. As shown in FIG. 15, when a user sets the robot 1 to the navigation mode using the touch panel 30 attached to the robot 1, the path creating unit 130 sets a target point (step S200). A target point is set based on the rank of the target points registered in the target-point registering process in the target-point ranking table. More particularly, a higher-ranked target point is set prior to a lower-ranked target point.

The path creating unit 130 creates a navigation path including a set target point (step S202). The navigation path is created based on the rank of the segment paths registered in the target-point registering process in the segment-path ranking table. More particularly, a higher-ranked segment path is selected at a turnoff point from which two or more segment paths stretch. When it is impossible to create the navigation path or to reach the target point (No at step S204), the control unit 10 returns to step S200 to set another target point.

The robot 1 starts traveling along the navigation path (step S206). The robot 1 regularly turns backward to check whether a visitor keeps following the robot 1. When the visitor doesn't keep following the robot 1, which means that the visitor is not detected (No at step S208), the robot 1 stops to wait the visitor in a predetermined time (step S210). When the visitor keeps following the robot 1 (Yes at step S208), the control unit 10 proceeds to a next step. When an obstacle is found while the robot 1 is traveling (Yes at step S212), the control unit 10 returns to step S200 to change to another target point or creates another navigation path to the same target point.

When an obstacle that is not drawn on the map is detected on the navigation path, the control unit 10 determines that an obstacle is found at step S212. When it is detected that a person other than the visitor following the robot 1 is on the navigation path and the robot 1 will interfere with the person, the control unit 10 also determines that an obstacle is found at step S212.

The control unit 10 repeats the above process until the robot 1 reaches the target point. When the robot 1 reaches the target point (Yes at step S214), an action corresponding to the target point is taken (step S216). The action is registered in the map database 120 with related to the target point.

An image is shot from the shooting position or nearby corresponding to the landmark image registered in the map database 120 (step S218). The position is corrected based on the image shot at step S218 and the landmark image (step S220). The control unit 10 repeats the above process until the robot 1 reaches the goal point. When the robot 1 reaches the goal point (Yes at step S222), the control unit 10 ends the navigation process. A lowest-ranked target point is set to the goal point.

The navigation process is described bellow by referring to an example. In this example, the segment-path ranking table as shown in FIG. 13 and the target-point ranking table as shown in FIG. 14 are registered in the map database 120. A highest-ranked target point D is selected as a target point at which the robot 1 aims first (step S200). A navigation path from a start point to the target point P is created (step S202). In this example, the created navigation path starts from the segment path A.

Although both segment paths B and C are selectable subsequent to the segment path A, the segment path C that is ranked higher than the segment path B is selected. Subsequently, although both segment paths E and G are selectable, the segment path E that is ranked higher than the segment path G is selected. By selecting segment paths F, H, and J following the segment path G, the navigation path to the target point β is completed. The robot 1 guides the visitor to the target point β following the above navigation path (steps S206 to S220). At the target point α on the above navigation path, an action corresponding to the target point αγ is taken.

The target point β is not the final target point, so that the control unit 10 returns to the step S200 again. The target point α is ranked next to the target point β, however the action corresponding to the target point α has already been taken, so that a target point γ that is ranked next to the target point α is selected as a next target point (step S200). A navigation path to the target point γ is created in the similar manner (step S202). The above process is repeated until the robot 1 guides the visitor to target point γ. When the robot 1 guides the visitor to target point γ, which is the final target point, (Yes at step S222), the control unit 10 ends the process.

Figure 16:
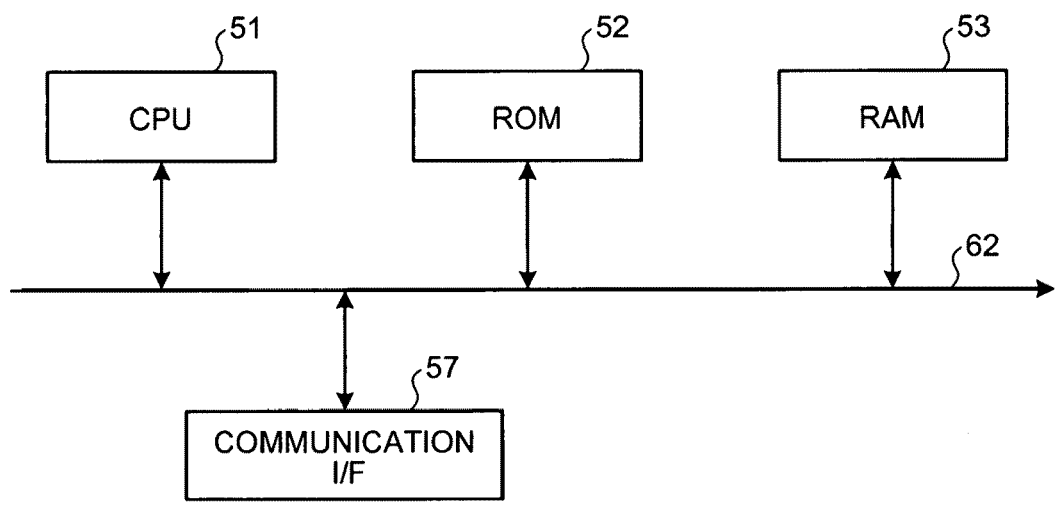
FIG. 16 is a hardware configuration of the robot according to the present invention.

As shown in FIG. 16, the robot 1 includes, as a hard configuration, a read only memory (ROM) 52 that stores therein a movement control program for executing the process of the movement control of the robot 1, a central processing unit (CPU) 51 that controls the units of the robot 1 according to the control program stored in the ROM 52, a random access memory (RAM) 53 that stores data necessary for controlling the robot 1, a communication interface (communication I/F) 57 that is connected to a network, and a bus 62 via which the units are connected to each other.

The above program can be provided in a form of an installable or executable file stored in a computer-readable recording medium such as a compact disk read only memory (CD-ROM), a floppy disk (FD, trademark), and a digital versatile disk (DVD).

In this case, when the robot 1 reads the program from the above recording medium and loads a read program into a main memory (not shown) by executing the read program, the units described in the above software configuration are generated on the main memory.

In addition, the program can be stored in another computer connected to the computer via a network such as the Internet, and downloaded to the computer via the network.

Although the invention has been described with respect to a specific embodiment, various modifications and improvements can be made to the embodiment.

For example, in the navigation process shown in FIG. 15, some of the target points registered in the map database 120 can be excluded from the target points to which the robot 1 guides the visitor. When the user specifies a target required time for the navigation while setting the robot 1 to the navigation mode, it is possible to create a navigation path including some high-ranked target points selected in the order of the ranking starting from the highest-ranked target point to a target point to which the robot 1 can guide the visitor within the predetermined time. To create a navigation path including more target points, it is allowable to add a process for further lowering the rank of low-ranked target points or target points that is far from both a starting point and a goal point.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling movement of a robot, the method comprising:
    detecting a target person to be followed;
    following detected target person;
    detecting an environment of a current position around the robot while following the detected target person;
    determining whether detected environment satisfies a predetermined target-point condition;
    specifying the current position as a target point, when the detected environment satisfies the predetermined target-point condition; and
    creating a path along which the robot travels including the target point, based on the target point and a movable path for the robot stored in a movable path storing unit.

2. The method according to claim 1, wherein
    the target-point condition is that the target person stops for a time equal to or longer than a first threshold value, and
    the position is specified as the target point when the target person stops at the position for the time equal to or longer than the first threshold value.

3. The method according to claim 1, wherein
    the target-point condition is that a number of persons other than the target person detected is as many as a second threshold value or more, and
    when the persons are detected from the environment around the robot at a position and the number of the persons detected is as many as the second threshold value or more, the position is specified as the target point.

4. The method according to claim 1, wherein
    the target-point condition is that a still object with a feature that discriminates the object from other areas is detected, and
    when the still object with the feature is detected from the environment around the robot at a position, the position is specified as the target point.

5. The method according to claim 1, wherein
    the target-point condition is that a speech equal to or louder than a third threshold value is detected, and
    when the speech equal to or louder than the third threshold value is detected from speeches around the robot at a position, the position is specified as the target point.

6. The method according to claim 1, further comprising:
    registering the target point in a target-point storing unit;
    determining whether a distance between the target point registered in the target-point storing unit and a newly target point is equal to or larger than a fourth threshold value; and
    registering the newly target point in the target-point storing unit, when it is determined that the distance is equal to or larger than the fourth threshold value.

7. The method according to claim 1, further comprising:
    registering the target point in a target-point storing unit;
    determining whether a distance between the newly target point and the target point registered in the target-point storing unit is smaller than a fourth threshold value;
    replacing the target point registered in the target-point storing unit with a target point having a position defined based on the target point registered in the target-point storing unit and a newly specified target point, when it is determined that the distance is smaller than the fourth threshold value.

8. The method according to claim 1, further comprising:
    registering the target point in a target-point storing unit;
    determining whether a distance between the target point registered in the target-point storing unit and a newly target point is equal to or smaller than a fifth threshold value;
    determining that the newly target point is identical to the target point stored in the target-point registering unit, when it is determined that the distance is smaller than the fifth threshold value;
    counting number of times the newly target point is determined to be identical to the target point registered in the storing unit;
    ranking the target point based on the counted number of times; and
    creating the path based on a rank of the target point.

9. The method according to claim 8, further comprising:
    detecting an obstacle while the robot travels along created path; and
    changing to another path that doesn't pass through the obstacle based on the rank when the obstacle is detected.

10. The method according to claim 1, further comprising:
    registering a path along which the robot follows the target person in the movable path storing unit as the movable path; and
    creating the path based on the target point and the movable path registered in the movable path storing unit.

11. The method according to claim 10, further comprising:
    determining whether a distance between the path along which the robot follows the target person and the movable path registered in the movable path storing unit is equal to or larger than a sixth threshold value; and
    registering the path along which the robot follows the target person in the movable path storing unit as the movable path, when it is determined that the distance is equal to or larger than the sixth threshold value.

12. The method according to claim 10, further comprising:
    determining whether a distance between the movable path registered in the path storing unit and the path along which the robot follows the target person is smaller than a sixth threshold value; and
    replacing the movable path registered in the path storing unit with a movable path defined based on the movable path registered in the path storing unit and the path along which the robot follows the target person, when it is determined that the distance is smaller than the sixth threshold value.

13. The method according to claim 1, further comprising:
determining whether a distance between the path along which the robot follows the target person and the movable path stored in the movable path storing unit is equal to or larger than a seventh threshold value;
determining that the path along which the robot follows the target person is identical to the movable path registered in the movable path storing unit, when it is determined that the distance is smaller than the seventh threshold value;
counting number of times the path along which the robot follows the target person is determined to be identical to the movable path registered in the path storing unit; and
ranking the movable path based on counted number of times; and
creating the path based on a rank of the movable path.

14. The method according to claim 1, further comprising creating a map including an area where the robot travels based on the detected environment.

15. The method according to claim 1, further comprising:
shooting an image of a landmark from a position around the landmark as an environment image while the robot follows the target person; and
registering the image of the landmark with related to the position from which the image of the landmark is shot in a landmark-image storing unit.

16. The method according to claim 15, further comprising:
detecting an image identical to the image of the landmark registered in the landmark-image storing unit while the robot travels; and
correcting a position of the robot based on the image of the landmark.

17. The method according to claim 1, further comprising:
shooting an image of the target point;
registering shot image of the target point with related to an action of the robot at the target point in a target-point-image storing unit;
specifying the action of the robot at the target point corresponding to the shot image of the target point; and
performing the specified action when the robot reaches the target point while traveling.

18. A mobile robot comprising:
a detecting unit that detects a target person to be followed;
a following-control unit that controls to follow the target person detected by the detecting unit;
an environment detecting unit that detects an environment of a current position around the robot while following the target person;
a target-point specifying unit that specifies a current position as a target point, when it is determined that detected environment satisfies a predetermined target-point condition;
a movable path storing unit that registers a movable path for the robot; and
a path creating unit that creates a path along which the robot travels including the target point, based on the movable path for the robot registered in the movable path storing unit and target point specified by the target-point specifying unit.

19. A computer program product comprising a computer usable medium having computer readable program codes for controlling movement of a robot embodied in the medium that when executed causes a computer to execute: detecting a target person to be followed;
following detected target person;
detecting an environment of a current position around the robot while following the detected target person;
determining whether detected environment satisfies a predetermined target-point condition;
specifying the current position as a target point, when the detected environment satisfies the predetermined target-point condition; and
creating a path along which the robot travels including the target point, based on the target point and a movable path for the robot stored in a movable path storing unit.

* * * * *